July 18, 1944.   C. H. BARR   2,353,985
PRESERVATION OF BIOLOGICALLY ACTIVE SUBSTANCES
Filed Nov. 7, 1938   2 Sheets-Sheet 1
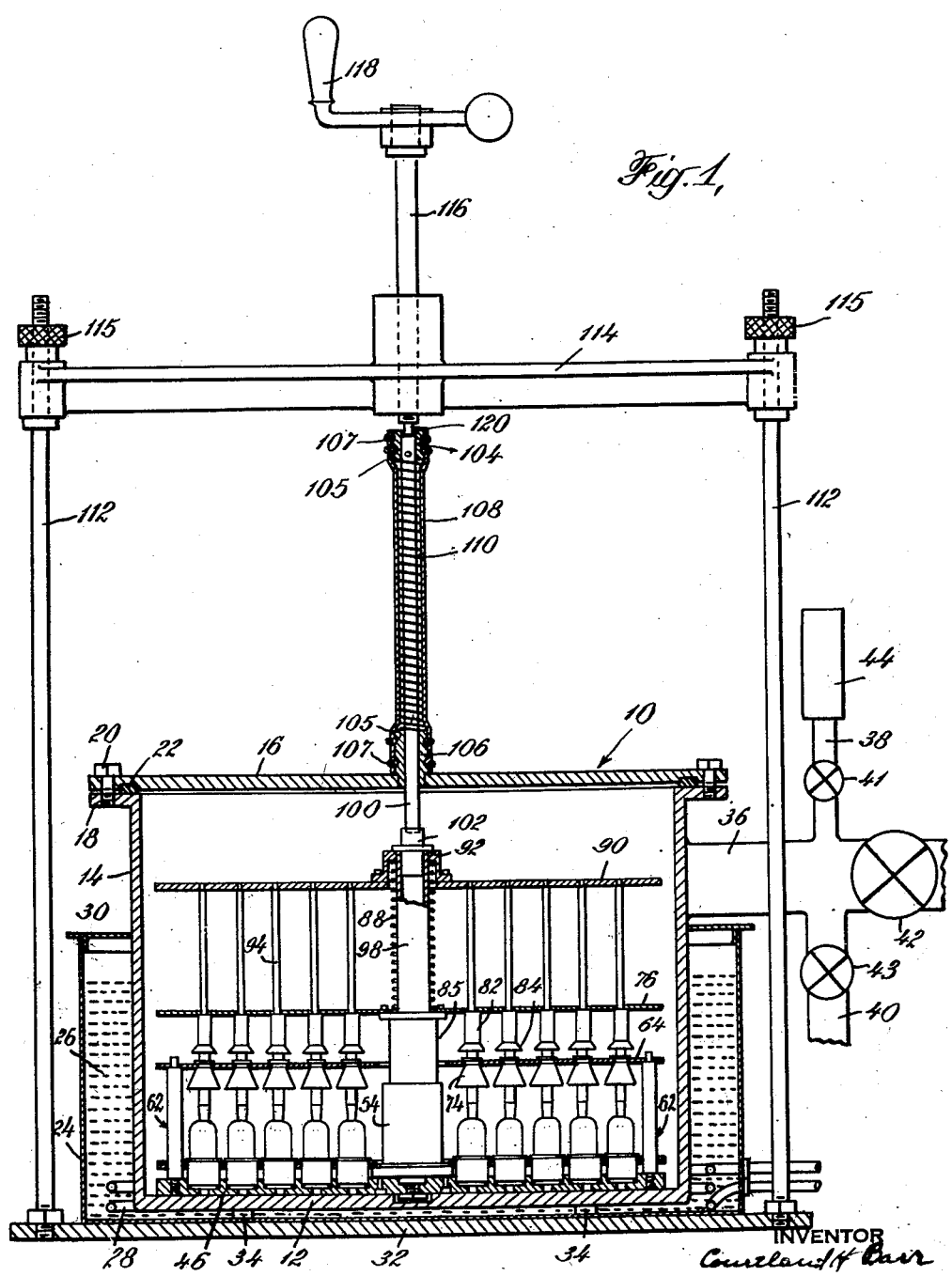
Fig. 1,
INVENTOR
Courtland H. Barr
BY
ATTORNEYS July 18, 1944.   C. H. BARR   2,353,985
PRESERVATION OF BIOLOGICALLY ACTIVE SUBSTANCES
Filed Nov. 7, 1938   2 Sheets-Sheet 2
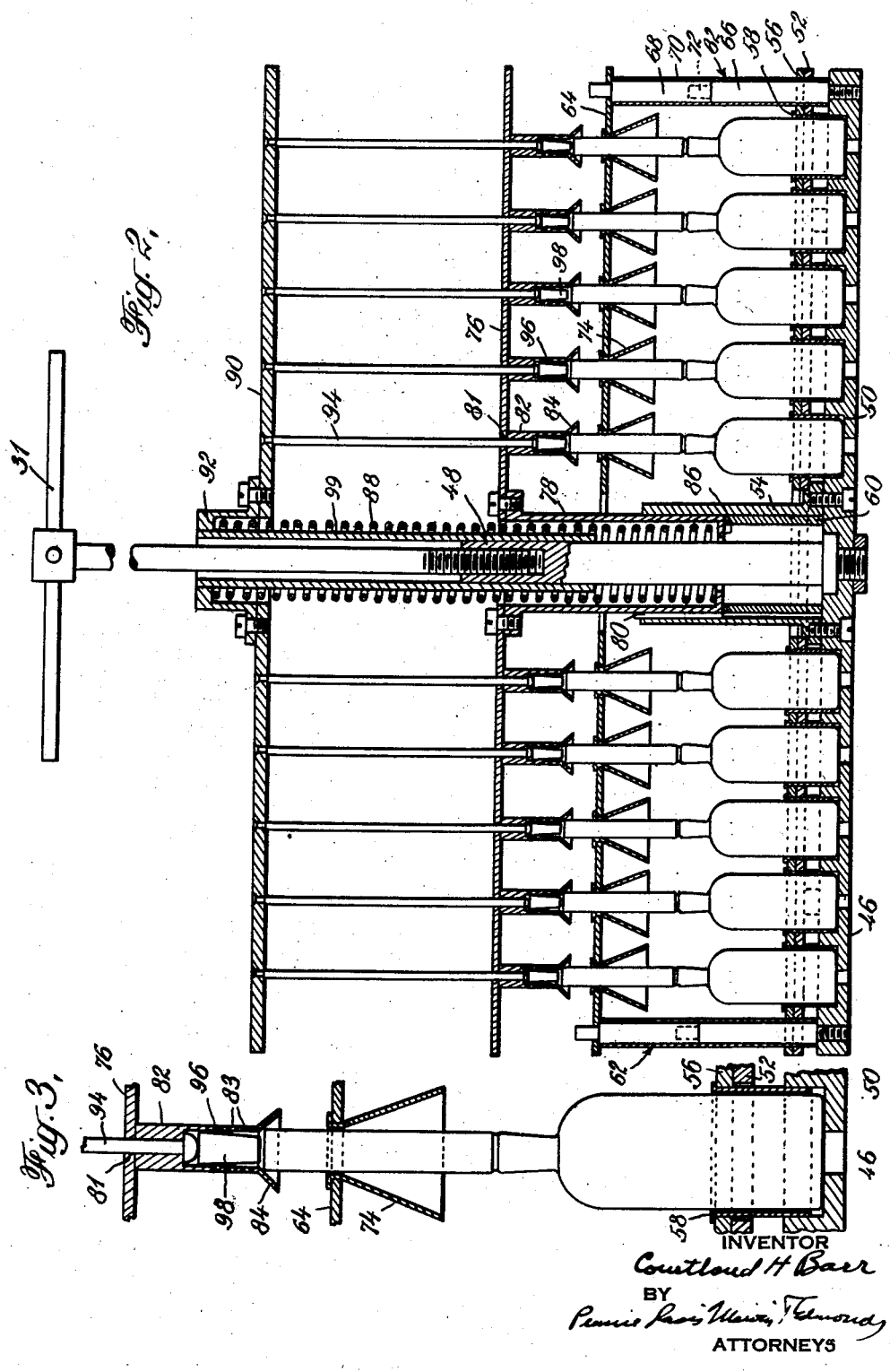

Patented July 18, 1944

2,353,985

UNITED STATES PATENT OFFICE 2,353,985

PRESERVATION OF BIOLOGICALLY ACTIVE SUBSTANCES

Courtland H. Barr, Glenolden, Pa., assignor to Sharp & Dohme, Incorporated, Philadelphia, Pa., a corporation of Maryland Application November 7, 1938, Serial No. 239,417

4 Claims. (Cl. 226—82)

This invention relates to improvements in processes and apparatus for the preservation of biologically active and other substances, including such substances as sera, protein solutions, bacterial cultures, pharmaceutical and glandular substances, viruses and other labile biological substances. It relates more particularly to improvements in processes and apparatus for sealing such substances in final containers under a high vacuum after desiccating such substances by freezing them and removing water under a high vacuum.

The improved processes and apparatus of the present invention permit the desiccation of such biologically active substances, with subsequent sealing in a glass or other container with a perforable stopper, under sterile conditions and with rigid control, with the simultaneous production of a large number of packages containing the material suitable for distribution and use.

Desiccated biologically active substances, produced in desiccated form by processes involving freezing of the original liquid material followed by removal of water by the application of a high vacuum without melting of the frozen material, are very porous and hygroscopic. It is desirable to package and distribute the material under a vacuum, both to prevent any deterioration, contamination or absorption of water, all of which might be caused by contact with air, and to facilitate the proper solution of the material in water or other aqueous fluid when restoration to a liquid state is desired. If such material is maintained under a vacuum, and water is introduced into the container before the vacuum is broken, the vacuum tends to pull the water into the pores and interstices of the material, insuring intimate contact and wetting of the material with the water, allowing rapid solution of the material. Maintenance of the vacuum also prevents impregnation of the material with gas which, if present, would tend to prevent the ready access of water to the interior portions of the material and to slow up its restoration to a liquid state.

Further, it is very desirable to seal the material within the container while continuing the same vacuum used in processing the material, without the introduction of air or other gas from the beginning of the desiccation to the final vacuum sealing, because of the greater assurance that if the material is sterile initially, it will be sterile when finally sealed in the container. Nothing is introduced into the container after the processing begins.

The present invention provides improved processes and apparatus which permit the production of desiccated biologically active and other substances in containers with perforable stoppers, sealed with glass seals, with the perforable stoppers, such as rubber stoppers, sealed within the glass, the perforable stoppers being positioned while the original vacuum is maintained in the containers, so that the material within the containers is sealed under the original vacuum, with assurance that the material is free from contamination, air, moisture, etc. The apparatus is such that a large number of such final containers, for example, 100 or more, may be readily processed at one time, with uniform dehydration of the material within the various containers, and with proper sealing of all of the containers after the desired degree of desiccation is attained.

In carrying out the invention, the biological or other substance to be desiccated is introduced in a liquid state into a suitable vial or other final container, preferably made of ordinary soft glass, and cylindrical in shape, provided with a relatively long tubular neck, the inside of which at the point adjacent the top of the vial or container is advantageously tapered to fit a rubber stopper. In general, the quantity of material introduced into the container should not exceed about 50% of the capacity of the container, to permit an ample surface for the sublimation or vaporization of the ice. The size of the vials or containers used may be widely varied, their capacity being determined by the amount of material which they are intended to contain and advantageously being such that each contains one or more unit portions of the material. Thus the capacity may vary from a fraction of a cubic centimeter to 50 or 100 or more cubic centimeters. After the introduction of the liquid substance into the container, the material is frozen by exposing the container to a refrigerant maintained at a very low temperature. The freezing is advantageously carried out while the container is being rotated about its longitudinal axis while in a more or less horizontal position, to insure a maximum exposed surface for sublimation. Of course, both the introduction of the material into the container, the freezing of the material within the container, and the subsequent steps of introducing a number of containers with frozen material in them into the apparatus is carried out with sterile technique.

When a large number of containers, for example, 100 more or less, containing the frozen liquid material have been prepared, they are placed, while open and under sterile conditions, in suitable apparatus, such as that of this invention, which has been previously sterilized, a high vacuum is applied simultaneously to all of the containers and the desiccation is carried out. After the desiccation has proceeded to the desired extent, a rubber stopper is introduced in the neck of each of the containers, and is forced down to form a tight joint in the tapered or constricted portion of the neck. This introduction of the stoppers is carried out without breaking the vacuum, by externally actuated means, so that the material is sealed in each container under a high vacuum with a perforable closure and without contamination, impairment of sterility, etc.

As a relatively large number of the containers are processed simultaneously in a vacuum chamber, and under substantially identical conditions, with the exterior and interior surfaces of the containers, as well as the stoppers, subjected to the dehydration, there is assurance that the product obtained conforms quite closely to the standards which may be set as to the degree of desiccation, vacuum within the containers, etc.

The process of the present invention provides for the dehydration of the biologically active or other substance in final containers in a suitable vacuum chamber, with simultaneous removal of water from the material in a large number of such containers and simultaneous sealing of such containers with perforable stoppers without breaking the vacuum and under the original vacuum used in the processing. This process may be carried out by placing a large number of containers in a suitable chamber under sterile conditions and producing a high vacuum within the chamber to effect a rapid evaporation or sublimation of the frozen water in the product until the desired degree of desiccation is attained. As the containers open directly into the evacuated chamber, there is no substantial resistance to flow of vapors except such as is offered by the container necks, which, of course, are of sufficient diameter to permit free flow. After the desiccation is completed, and without breaking or destroying the vacuum within the chamber, a perforable stopper is introduced into the neck of each container, and is forced into tight engagement with the neck of the container, which is advantageously tapered as explained.

It is advantageous to supply heat to the material undergoing desiccation, as by jacketing the vacuum chamber at least over the lower portions thereof, with a controllable heating bath, so that the desiccation is not unduly prolonged because of the refrigerating effect of the vaporization or sublimation. After the stoppers have been properly seated, air is introduced into the chamber, advantageously through an air filter to sterilize it, the containers are removed from the chamber and the necks are flame sealed above the stoppers.

The apparatus of the invention includes a chamber provided with a removable wall section adapted to be closed vacuum-tight and with an outlet leading to one or more vacuum condensing systems, as will be subsequently explained. There is also provided a rack or other supporting means, advantageously positioned at the bottom of the chamber, adapted to be placed within the chamber to support a large number of containers in more or less fixed positions, so that the containers rest on the bottom of the chamber with their necks extending upwardly. A corresponding number of plungers, suitably supported, are provided above the rack, so located that when in their normal position, each plunger has beneath it a container. The size of the plungers is such that they may readily pass into the tubular necks of the containers. Guides are provided for each of the plungers so that when the plungers are forced downwardly toward the containers, each plunger will enter the neck of the corresponding container. Below the plungers are provided a corresponding number of sleeves or other supports, which may surround the lower portions of the plungers and serve as their guides, each of which is adapted to support a perforable stopper. The plungers are advantageously supported at the top by common supporting means, such as a disc or plate, such that when the disc or plate is forced downwardly, each of the plungers is also forced downwardly to disengage the stoppers from the sleeves or other supports, and to force the stoppers into place in the tapered portions of the necks of the containers. The rack for supporting the containers, the plungers, and the sleeves or other supporting means for the stoppers, together with guides which are advantageously provided to hold the upper portions of the containers in position, are advantageously fastened to or supported on a single central axis, so that the entire assembly may be removed from the chamber and handled as a unit, for sterilizing or other purposes.

It is also advantageous to provide a heating bath around the chamber, to provide a regulated flow of heat through the chamber walls to the frozen material within the containers, to supply the latent heat of vaporization or sublimation of the ice and thus to increase the rapidity and degree of the desiccation. The rate at which heat is supplied should not be so great as to cause melting or softening of the frozen material, or so low as to impede or slow up the process of desiccation, but should be such as to give a reasonably rapid removal of water, without melting or softening.

The invention will be further described in connection with the accompanying drawings, which illustrate, in a somewhat diagrammatic fashion, apparatus which embodies the invention and which is advantageous for use in the desiccation of biological products.

In the drawings,

Fig. 1 is a view in elevation of the apparatus, showing in vertical section the vacuum chamber, the plunger actuating means and the heating bath;

Fig. 2 is a vertical sectional view of the removable assembly which fits within the chamber, showing the containers and stoppers in place; and Fig. 3 is a sectional view in elevation of a portion of the assembly of Fig. 1, showing in somewhat greater detail a method of supporting the containers and the stoppers.

In Fig. 1, there is provided a chamber 10, with a bottom 12, side walls 14 and a removable cover plate 16, fastened to the walls 14 by flanges 18 and bolts 20, with the rubber gasket 22 to insure a vacuum-tight seal. The bolts 20 may be omitted, if desired, particularly where the cover plate forms the top wall, or a portion of it, as the weight of the cover plate is usually sufficient to permit evacuation without much influx of air, and, when the chamber is evacuated, the atmospheric pressure on the cover plate is sufficient to hold it in vacuum-tight engagement with the flange of the vacuum chamber.

Around the chamber 10 is provided a heating bath 24, containing a heat conductive medium 26 and heating coils 28. The temperature of the heating bath should be regulated by a suitable thermostat, or other control means (not shown). A cover 30 for the heating bath is provided. Other means of supplying heat in controlled amounts may, of course, be used. For example, instead of providing heating coils 28 in the heating bath, the heating medium may be withdrawn and heated by outside means, or a continuous flow of properly heated medium through the heating bath may be provided, or the heating bath may be connected to a vessel containing properly heated heating medium, below or adjacent the heating bath, with circulation to or from the heating bath depending on convection currents, etc.

The chamber 10, and the heating bath 24, are supported on the base plate 32. The chamber 10 is supported somewhat above the bottom of the heating bath by the legs 34, which rest on the bottom of the heating bath, so that the chamber 10 in effect is directly supported by the base plate 32.

The chamber 10 is provided with an outlet 36, which in turn is provided with two branches, 38 and 40, each branch and the outlet 36 being provided with a vacuum tight valve, 41, 42 and 43. Outlet 38 is connected to an air filter 44, so that sterile air may be introduced into the chamber after tightly closing the containers with stoppers. Outlet 36 leads to a condenser and vacuum system, and outlet 40 to an auxiliary condenser and vacuum system, as will be hereinafter explained.

Positioned within the vacuum chamber 10 is the removable container supporting and plunger mechanism, shown in section in Fig. 2. This includes a bottom supporting plate 46 to which is fastened a central pillar 48. The plate 46 is provided with a series of depressions 50, adapted to receive the containers. Above the bottom plate 46 may be provided a second plate 52, fastened to the sleeve 54 and provided with holes corresponding to the depressions 50 in the plate 46, to assist in holding the containers in proper alignment. Above plate 52 may be provided a second plate 56, readily detachable, having sleeves 58, which serve to adapt the size of the holes in the plate 52 and the depressions 50 in the plate 46 to the size of the containers used. If desired, the plate 56 may be provided with cups instead of the sleeves 58, to adapt the apparatus for use with small sized containers. The sleeve 54 is rigidly connected to the plate 46, and is around a second, shorter sleeve 60, which is removable.

At the periphery of the plate 46 are provided posts 62, advantageously of adjustable height, as illustrated. Advantageously three or more of these posts are provided, because they serve to fix the position of the container aligning plates 52, 56 and 64, which fit over these posts. The posts are made adjustable by providing a short inner fixed post 66 and removable upper sections 68 held in place by the removable sleeve 70 and fitting over the lug 72.

The posts 62 serve not only to position correctly the plates 52 and 56, but to support and position the plate 64, which is provided with downwardly extending cones 74, which flare downwardly from holes centered vertically above the holes 50 in the plate 46. Plate 64 serves to hold the necks of the containers in the proper position, and is provided with the conical elements 74 to simplify passing the plate 64 over the container necks after the containers have been placed in position on the plate 46. Posts 62 are made of adjustable height so the position of plate 64 can be varied to accommodate containers of different sizes. In general, all of the containers processed in one operation will be of the same height, and the position of the plate 64 need be varied only when the size of the container being used is changed.

Above the plate 64 is positioned another plate 76, supported by the sleeve 78, which in turn is supported by the sleeve 60, both sleeve 60 and sleeve 78 fitting within sleeve 54. Sleeve 78 is provided with a key 80 which fits a corresponding key-way in the sleeve 54 to insure proper positioning of the plate 76. The plate 76 is provided with holes 81, beneath which are the sleeves 82, advantageously provided with the flaring portions 84. These holes and sleeves are in alignment with the holes in the plates 52, 56 and 64 and the depressions 50 in the plate 46. The length of the sleeve 60 and the sleeve 78 are such that the sleeves 82 extend downwardly to a point just above the top of the necks of the containers, advantageously with the flaring portions 84 extending a little below the tops of the necks of the containers. Ample space above and around the tops of the container necks to permit free flow of vapor from the containers should be provided. Holes or slots 83, in the sleeves 82, are advantageously provided to decrease the resistance to the flow of vapor. By changing the length of the sleeve 60, the position of the plate 76 may be adjusted to accommodate containers of different sizes.

Sleeve 78 is provided at the bottom with an inwardly extending lip 86, which supports the spring 88, which in turn supports the plate 90 by the holding flange 92. This spring should be fairly stiff, to afford adequate support for the plate 90. Attached to the plate 90 are rods 94 extending downwardly about half way through the sleeve 82, each of which is provided with means, such as the ribs 96, to lightly engage and hold in place a rubber stopper 98. The length of the rods 94 is such that in normal position, they extend down to about the top of the stoppers 98. The rods 94, are of course, of uniform length. Attached to the holding flange 92 is a sleeve 99, which serves to support the spring 88, this sleeve extending downwardly but a portion of the way past the top of the sleeve 78. Sleeves 82 should have a smaller inner diameter at the top than at the bottom, and the lower ends of the rods 94 should be expanded, or provided with buttons as illustrated, to prevent the plungers from becoming disengaged from the guiding sleeves, and to prevent the spring 88 from forcing the plate 90 too high.

The entire assembly, as described, may be lifted by the handle 31, which may be detachably fastened to the central post 48, and the assembly may thus be moved as a unit, and removed from, or placed within, the container 10 as a unit.

At the top of the container 10 is provided a rod 100, which is movable vertically. This rod is provided at the bottom with a detachable block 102, which when the apparatus is assembled, bears against the holding flange 92. At the top of the movable rod 100 is provided a fixed flange 104, rigidly fastened to the rod 100. Rigidly fastened to the cover 16 is the flange 106, through which the rod 100 passes. To provide a vacuum-tight seal, rubber tube 108, supported by the spiral spring 110 extends from flange 104 to flange 106, and tightly embraces both. To provide this seal, there may be provided grooves 105 in flanges 104 and 106 and cooperating clamping rings or wires 107 around the rubber tube 108.

Extending from the base 32 are the tie rods 112, which in turn are removably fastened to the yoke 114 by the nuts 115, in effect forming a mechanical press. Passing through the yoke 114 is the screw rod 116, to which is fastened the handle 118. The screw rod bears against the upper portion of the vertically moving rod 100 by a suitable bearing surface 120.

By turning the handle 118, the rod 100 may be forced downwardly, in turn forcing downwardly the plate 90, displacing the stoppers from the sleeves 82 into the necks of the containers. Further downward movement of the rod 100 forces the plungers 94 into the necks of the containers, so that they force the stoppers securely into position in the tapered portions of the necks of the containers.

The lengths of the adjustable posts 62, sleeve 60, the block 102, and the distance the rod 100 is moved must be adjusted to properly accommodate the containers used, so that the plunger rods 94 force the stoppers the proper distance into the container necks. It is to be understood that in any given operation, the containers and stoppers will be uniform, but the apparatus may be readily adjusted for use with different size containers by making proper adjustments in the various parts, all of which are detachable and replaceable.

In operation, the entire assembly supported by the plate 46 is removed from the container 10, and is sterilized as a unit, or with the upper portions removed and separately sterilized. Containers with frozen material in them, produced as heretofore explained, are placed in proper position on the plate 46, the aligning plate 64 is placed in position, after which the plate 76 with the stoppers in place in the sleeves 82 (these are advantageously placed in the sleeves prior to the sterilizing) as a unit with the plate 90 and the rods 94 depending therefrom through the sleeves 82 are placed in position. These operations must, of course, be carried out with sterile technique, in accordance with usual practice. The entire assembly is then lifted, as by the handle 31, and placed in the container 10. The handle is then removed, the desired detachable block 102 is set into the flange 92 (see Fig. 1) and the cover 16 is fastened in place by the bolts 20. Valves 41, 42 and 43 are closed.

Valve 43, on outlet 40, which leads to a suitable condenser or water absorbing apparatus and to a high vacuum pump, which need not have a very large capacity, is opened, the air is removed from the container 10 and a high vacuum established therein, causing a more or less rapid sublimation or vaporization of the frozen material in the containers. This operation of placing the containers in position, and assembling the apparatus, must be carried out with sufficient rapidity to make sure that the desiccation is under way before any of the frozen material melts or softens, so that all removal of water is from solidly frozen material. After the vaporization or sublimation has begun, the heating bath may be placed in operation, to supply heat to the containers to facilitate the dehydration.

After the high vacuum is established, and the desiccation is under way, with water being absorbed in the condenser or other water absorbing means connected to outlet 40, the valve 42 is opened, and the valve 43 is closed. Outlet 36 leads to a main water condenser or absorber and vacuum pump, to which may be connected a number of other desiccating units. The flow of gas and vapor is always out from the chamber 10 into the condensing and vacuum systems, so that after the chamber is initially sealed no air or gas can flow into it prior to the sealing of the containers to carry in foreign matter which might contaminate the material being treated.

The vaporization or sublimation of the ice from the frozen material exerts a considerable cooling effect, and if heat is not supplied sufficiently fast, the material is reduced in temperature, with lowering of the rate of vaporization or sublimation. To avoid this, heat is supplied by the heating coils 28 in the heating bath 24, the rate of heat supplied being advantageously adjusted to balance the heat of vaporization or sublimation, with maintenance of the frozen material at a temperature such that the vaporization is reasonably rapid, but sufficiently low so that it does not melt or soften. After most of the water is removed from the frozen material, so that even at ordinary temperatures it has a dry appearance, the temperature of the material is allowed to rise to facilitate the removal of the last traces of water. By so operating, a product containing one-half of one percent or less of water is readily obtained, such products having about 99.95% or somewhat more of the original water removed. In general, heat should be supplied as fast as possible without causing melting or softening of the frozen material.

By using two vacuum connections, a connection to a main condensing and vacuum system, and a connection to an auxiliary condensing and vacuum system, it is possible to use one large condensing and vacuum system for a number of such units of apparatus such as have been described, so that one or more units may be added to, or removed from, the system without disturbing the conditions in the main condensing and vacuum system, as apparatus is connected to the main system only when the conditions in it are substantially those of the main system.

Insofar as the process of freezing and removing the water is concerned, the process which is advantageously used is one described in the Reichel Patent Re. 20,969, with freezing of the material by indirect exposure to a refrigerant maintained at —70° C. or lower, and with condensation of the water vapor removed under the influence of a high vacuum by exposure to a refrigerant maintained at a similarly low temperature, although it will be appreciated that other means of collecting the water vapor, etc., may be used. When such a process is used, each outlet is connected to a cold condenser maintained at a sufficiently low temperature, for example, 50° C. or lower, which in turn is connected to a vacuum pump. The water vapor is condensed in the cold condenser and the vacuum pump removes fixed gases and maintains the high vacuum necessary for sublimation or vaporization. Two such condensing and vacuum systems are advantageously provided, one of large capacity and one which may be of smaller capacity, to facilitate the operation of a number of such desiccating units as have been described. The unit is first connected to the smaller (auxiliary) system to evacuate it and to initiate the desiccation, and subsequently is connected to the main system, by which the major portion of the water is removed. It should be understood that other water absorbing means than cold condensers, such as chemical desiccants, etc., may be used if desired. The condensing or water absorbing system forms no part of the present invention.

After the desiccation has proceeded to the desired extent, and the stoppers have been forced into the container necks, the valve 42 is closed, and sterile air is admitted to the chamber through the filter 44, line 38 and valve 41. The cover is then removed, and the containers taken out and flame-sealed above the stoppers, so that a container, with a perforable stopper in the neck, and a flame seal above the stopper, is obtained. Such containers, and methods of sealing the necks, are described in my prior application, Serial No. 90,033, filed July 10, 1936. It will be noted that the containers are sealed by the perforable stoppers under the vacuum used in processing the material, so that there can be no contamination of the material during the processing, or after the processing and before the sealing.

It will be thus understood that the present invention provides improved processes and apparatus by which a large number of packages containing a desiccated biologically active or other substance sealed under a high vacuum with a perforable stopper, with a glass seal over the perforable stopper, may be processed simultaneously, with assurance of sterility and with a minimum of labor.

I claim:

1. Apparatus for the production of desiccated biologically active and other substances sealed in evacuated containers with a perforable stopper comprising a chamber with a removable wall section adapted to be sealed with a vacuum tight seal, a conduit leading from said chamber, means within said chamber for supporting a plurality of containers vertically at a uniform level, aligning means above said supporting means to keep said containers in a vertical position, means to support a perforable stopper above each said container and in alignment therewith, and means, including a plurality of plungers movable in guides for forcing said stoppers into the corresponding containers and into tight engagement therewith.

2. Apparatus adapted for the production of desiccated biologically active and other material sealed in evacuated containers comprising a chamber adapted to be hermetically sealed provided with an outlet through which the chamber may be evacuated and with a removable wall section, means within said chamber to support a plurality of containers in fixed positions, means within said chamber to support a perforable stopper above each said container, and externally actuated means for introducing said stoppers into the necks of the containers, and for forcing them into tight engagement therewith to effectively seal the containers and further provided with an external heating bath.

3. Apparatus for the production of desiccated biologically active and other substances in evacuated containers provided with perforable stoppers comprising a chamber provided with a removable wall section adapted to be hermetically sealed, means within said chamber for supporting a plurality of containers in an upright position including adapters to permit adjustment for containers of various sizes, guide means, including a plate provided with openings with downwardly extending cones positioned thereunder to engage the necks of said containers and hold them in vertical alignment, means above said guide means, including a plate provided with openings corresponding to the container positions, with vertically positioned sleeves for supporting a perforable stopper vertically above each said container, a plunger adapted to be moved vertically through each such sleeve and to enter the necks of the containers, and externally actuated means for forcing each such plunger downwardly to displace the stoppers from the sleeves into the container necks and to force them in tight engagement therewith.

4. The process of producing desiccated biologically active and other substances in evacuated final containers provided with perforable stoppers which comprises introducing a large number of containers provided with open necks and containing frozen material to be desiccated into a chamber, sealing such chamber, producing a high vacuum within the chamber whereby water is removed from the frozen material, introducing a perforable stopper into the neck of each container and forcing such stoppers into tight engagement therewith, simultaneously and without breaking the vacuum, removing such sealed evacuated containers from the chamber and flame-sealing the necks thereof above the perforable stoppers.

COURTLAND H. BARR.